Patented July 11, 1950

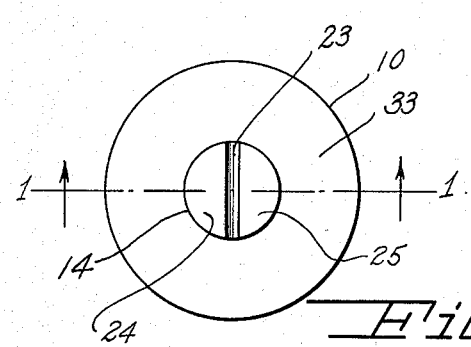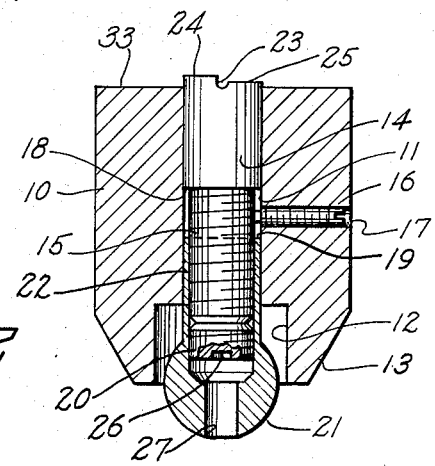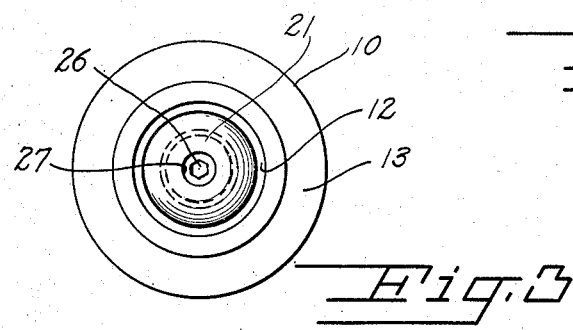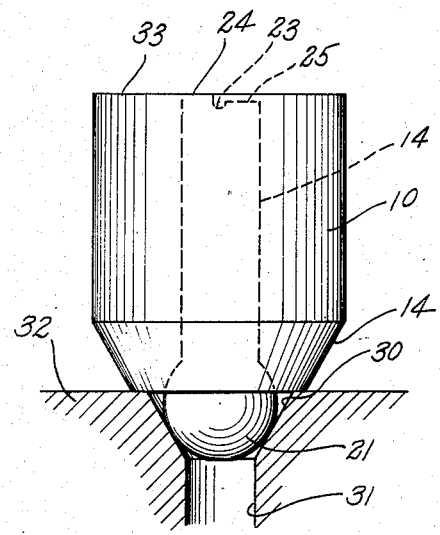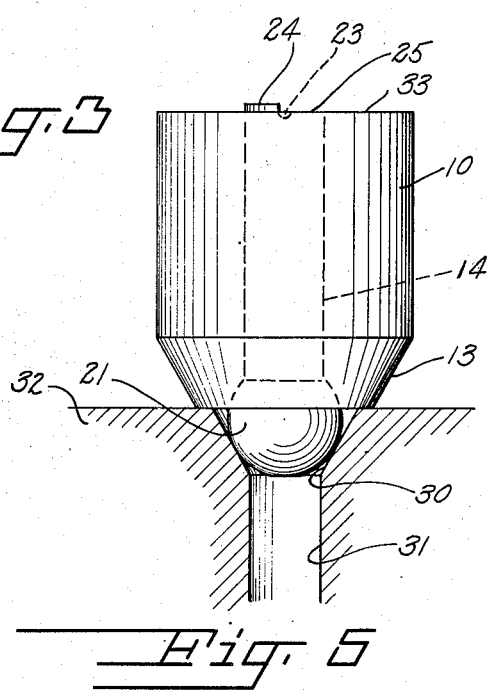
INVENTOR.
Wesley G. Prince

2,514,794

UNITED STATES PATENT OFFICE 2,514,794

FLUSH PIN GAUGE

Wesley G. Prince, Menominee, Mich.

Application October 7, 1947, Serial No. 778,511

3 Claims. (Cl. 33—169)

This invention relates to a flush pin gauge, and has as its primary object the provision of an improved gauge adapted for the checking of the depths of countersinks, counterbores, drilled holes, slots, etc.

A further object of the invention is the provision of a flush pin gauge provided with a spherical member adapted to engage in a countersink or counterbore, the member being removable, and consequently interchangeable for a variety of sizes of apertures, bores, countersinks or the like.

A further object of the invention is the provision of a device of this character wherein the depth of a countersink, for example, may be accurately and effectively checked within predetermined limits, the arrangement being such that a variation in depth of the countersink limited by the tolerance of the job may be accurately measured, while too deep or too shallow a countersink will be immediately detected by use of the gauge.

Still another object of the invention is the provision of the device of this character providing cylindrical line contact about the periphery of a countersink, or bore, or the like, in such manner as to provide extremely accurate measurement of the depth thereof, such measurement not being affected by chips, shavings, or the like, which now customarily affect the angularly-ground shafts of conventional flush pin gauges.

Still other objects will, in part, be obvious and in part be pointed out as the description of the invention proceeds, and shown in the accompanying drawing, wherein there is disclosed a preferred embodiment of the inventive concept.

In the drawing:

Figure 1 is a vertical, longitudinal sectional view taken substantially along the center-line of one form of gauge embodying features of the instant invention, certain interior portions thereof being shown in plan, the view being taken substantially along the line I—I of Figure 2.

Figure 2 is a top plan view of the device.

Figure 3 is a bottom plan view of the device.

Figures 4 and 5 are side elevational views of the assembled gauge shown in association with a countersink, the latter being sectioned, in two different positions of adjustment.

Similar reference characters refer to similar parts throughout the several views of the drawings.

Referring to the drawings in detail, the device of the instant invention comprises an elongated, cylindrical body 10, having flat, substantially parallel ends and a longitudinal bore 11 extending therethrough, substantially parallel to said ends. A counterbore 12 is provided in said body at its base end substantially concentric with said bore. The lower portion of the body 10 is tapered as at 13, forming a conical frustrum, to facilitate accuracy of insertion of the gauge into a countersink or counter-bore. Positioned within the bore 11 is a cylindrical plunger 14, provided with an externally screw-threaded portion 15 of reduced diameter providing an annular shoulder 18 at the inner end of the screw-threaded portion. A gauge ball 21 has an internally screw-threaded sleeve 22 integral therewith into which the reduced portion 15 of plunger 14 is threaded. The end of sleeve 22 opposite ball 21 provides an annular shoulder 19 spaced from and opposed to shoulder 18. A set screw 16 having a reduced, cylindrical inner end portion is threaded through an internally screw-threaded, radially-extending aperture 17 in body 10 so that its reduced inner end is disposed between shoulders 18 and 19 to maintain body 10, plunger 14 and gauge ball 21 against separation.

With the above-disclosed arrangement the gauge ball may be adjustably threaded onto the cylindrical member or plunger 14. It is secured in adjusted position relative to the plunger by a locking plug 20 threaded in the sleeve 22 at the end of plunger 14 received in the sleeve and bearing against the plunger to lock the plunger and sleeve against relative rotation. This plug 20 is provided in the face thereof facing ball 21 with a hexagonal recess 26 which receives a conventional hexagonally-shaped wrench for turning the plug. The ball 21 is provided with an aperture or hole 27 opening at the bottom center thereof and extending coaxially with the longitudinal axis of ball 21 and sleeve 22 through which hole the wrench may be inserted to turn the locking plug 20 when it is desired to adjust the gauge ball relative to the stem 14.

The upper end of plunger 14 is provided with a transverse groove 23, defining two flat upper surfaces 24 and 25, of relatively different heights, the distance between being accurately measured in thousandths or tens of thousandths of an inch to define the tolerance permitted in the depth of the countersink, counterbore, or other depth to be measured.

In the operation of the device, as best shown in Figures 4 and 5, the body 10 is positioned over a countersink 30, which may communicate with a bore 31 in any desired piece of work 32. When the parts assume the position as disclosed in Figure 4 with upper surface 24 level with or above the top end 33 of the body portion 10 the user of the gauge is assured that the countersink 30 is of maximum permissible depth or less. Correspondingly with the parts in the position shown in Figure 5, with the surface 25 substantially flush or below the top 33 of the body 10 the operator may determine that the countersink is of minimum depth or greater.

Thus as long as the gauge assumes one of the two positions shown in Figures 4 and 5, or any position therebetween, the operator is aware that the countersink, or other depth being measured, is within permissible limits.

Obviously, when the surface 25 is above the surface 33 the countersink is too shallow, and equally obviously, when the surface 24 is below the surface 33 the countersink is too deep.

From the foregoing it will now be seen that there is herein provided an improved flush pin gauge which accomplishes all the objects of this invention, which may be re-utilized successively for a plurality of various types of jobs merely by the substitution of a ball member 21 of a size in accordance with the requirement of the countersink or bore being measured, and which accomplishes all the objects of this invention, and others, including many advantages of great practical utility and commercial importance.

As various embodiments may be made in this inventive concept, and various modifications may be made in the embodiment hereinbefore shown and described, it is to be understood that all matter herein is to be interpreted merely as illustrative and not in a limiting sense.

I claim:

1. A flush pin gauge comprising an elongated substantially cylindrical body having flat, substantially parallel ends and a bore extending longitudinally therethrough substantially perpendicular to said ends, said body having a counterbore in one end coaxial with said bore, a cylindrical plunger slidable in said bore and having on one end stepped surfaces registrable with the opposite end of said body for indicating the maximum and minimum depth limits of a work piece aperture to be measured, said plunger having an externally screw-threaded portion of reduced diameter terminating at the opposite end of said plunger, a gauge ball received in said counterbore, and an internally screw-threaded sleeve joined at one end to said ball and projecting therefrom, said sleeve receiving said externally screw-threaded portion of said plunger, and means in said sleeve locking said plunger in adjusted position relative to said sleeve.

2. A flush pin gauge comprising an elongated body having flat, substantially parallel ends and a bore extending longitudinally therethrough substantially perpendicular to said ends, said body having in one end a counterbore substantially coaxial with said bore, a cylindrical plunger slidable in said bore and having on one end stepped surfaces substantially perpendicular to the longitudinal center line of said bore and registrable with the opposite end of said body for indicating the maximum and minimum depth limits of a work piece aperture to be measured, said plunger having within said bore an externally screw-threaded portion of reduced diameter terminating at the opposite end of said plunger, a gauge ball receivable in said counterbore, an internally screw-threaded sleeve joined at one end to said ball and receiving said externally screw-threaded portion of said plunger, and means locking said plunger in adjusted position in said sleeve comprising a locking plug threaded in said sleeve at the sleeve-received end of said plunger to bear against said plunger and lock the same against rotation relative to said sleeve, said plug having a non-circular, wrench-receiving recess therein and said ball having an aperture therethrough for admission of a wrench of said plug recess.

3. A flush pin gauge comprising an elongated body having flat, substantially parallel ends and a bore extending longitudinally therethrough substantially perpendicular to said ends, said body having in one end a counterbore substantially coaxial with said bore, a cylindrical plunger slidable in said bore and having on one end stepped surfaces registrable with the opposite end of said body for indicating the maximum and minimum depth limits of a work piece aperture to be measured, a ball received in said counterbore and adjustably secured to said plunger, said ball being extendible out of said recess for insertion into a work piece aperture to be measured, said body having a radially-disposed, internally screw-threaded aperture therein extending from the exterior of said body into said bore, and means releasably maintaining said body, said plunger and said gauge ball in operative association comprising means adjustably securing said ball to said plunger, a pair of spaced-apart shoulders on said ball-and-plunger assembly within said bore, and a set screw threaded through said aperture and having one end disposed between said shoulders

WESLEY G. PRINCE.

REFERENCES CITED

The following references are of record in the file of this patent:

UNITED STATES PATENTS

| Number | Name | Date |
|---|---|---|
| 1,170,255 | Hess | Feb. 1, 1916 |
| 1,395,768 | Pountney | Nov. 1, 1921 |
| 1,459,896 | John | June 26, 1923 |
| 1,737,726 | Muzyn | Dec. 3, 1929 |
| 2,165,881 | Bennett | July 11, 1939 |
| 2,212,306 | Schwartz | Aug. 20, 1940 |
| 2,363,165 | Vierling | Nov. 21, 1944 |

OTHER REFERENCES

Pub.: "American Machinist," page 130, Feb. 14, 1946.

Pub.: "Machinery," Page 793, June 1925.